United States Patent [19]
Allen

[11] Patent Number: 5,959,376
[45] Date of Patent: Sep. 28, 1999

[54] MICROELECTROMECHANICAL RECIPROCATING-TOOTH INDEXING APPARATUS

[75] Inventor: James J. Allen, Albuquerque, N.Mex.

[73] Assignee: Sandia Corporation, Albuquerque, N.Mex.

[21] Appl. No.: 09/150,873

[22] Filed: Sep. 10, 1998

[51] Int. Cl.$^6$ .................................................. F16H 21/16
[52] U.S. Cl. .................... 310/40 MM; 310/80; 310/306; 310/308; 74/128
[58] Field of Search ............................. 74/126, 128, 129, 74/130; 310/306, 307, 40 MM, 308, 309, 80, 112

[56] References Cited

U.S. PATENT DOCUMENTS

| | | | |
|---|---|---|---|
| 3,083,581 | 4/1963 | Jamison | 73/128 |
| 5,378,583 | 1/1995 | Guckel | 430/325 |
| 5,631,514 | 5/1997 | Garcia | 310/309 |

OTHER PUBLICATIONS

J.H. Comtois and V.M. Bright, "Surface Micromachined Polysilicon Thermal Actuator Arrays and Applications," *Proceedings of the Solid–State Sensor and Actuator Workshop*, pp. 174–177 (Jun. 2, 1996).

J.H. Comtois, M.A. Michalicek and C.C. Barron, "Fabricating Micro–Instruments in Surface–Micromachined Polycrystalline Silicon," Proceedings of the 43rd International Instrumentation Symposium Instrument Society of America, pp. 169–179 (1997).

Allen et al., "Micromachine Wedge Stepping Motor" 1998 ASME International Mechanical Engineering Congress and Exposition; Anaheim, CA, Nov. 1998.

Primary Examiner—Nestor Ramirez
Assistant Examiner—Burton S. Mullins
Attorney, Agent, or Firm—John P. Hohimer

[57] ABSTRACT

An indexing apparatus is disclosed that can be used to rotate a gear or move a rack in a precise, controllable manner. The indexing apparatus, based on a reciprocating shuttle driven by one or more actuators, can be formed either as a micromachine, or as a millimachine. The reciprocating shuttle of the indexing apparatus can be driven by a thermal, electrostatic or electromagnetic actuator, with one or more wedge-shaped drive teeth of the shuttle being moveable to engage and slide against indexing teeth on the gear or rack, thereby moving the gear or rack. The indexing apparatus can be formed by either surface micromachining processes or LIGA processes, depending on the size of the apparatus that is to be formed.

44 Claims, 8 Drawing Sheets

MICROELECTROMECHANICAL RECIPROCATING-TOOTH INDEXING APPARATUS

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates generally to microelectromechanical devices, and specifically to an indexing mechanism that can be used to provide a precise and controlled motion of a moveable member such as a rotary gear or a linear rack.

BACKGROUND OF THE INVENTION

Polysilicon surface micromachining adapts planar fabrication process steps known to the integrated circuit (IC) industry to manufacture microelectromechanical or micromechanical devices. The standard building-block processes for polysilicon surface micromachining are deposition and photolithographically patterning of alternate layers of low-stress polycrystalline silicon (also termed polysilicon) and a sacrificial material (e.g. silicon dioxide or a silicate glass). Vias etched through the sacrificial layers at predetermined locations provide anchor points to a substrate and mechanical and electrical interconnections between the polysilicon layers. Functional elements of the device are built up layer by layer using a series of deposition and patterning process steps. After the device structure is completed, it can be released for movement by removing the sacrificial material using a selective etchant such as hydrofluoric acid (HF) which does not substantially attack the polysilicon layers.

The result is a construction system generally consisting of a first layer of polysilicon which provides electrical interconnections and/or a voltage reference plane, and up to three or more additional layers of mechanical polysilicon which can be used to form functional elements ranging from simple cantilevered beams to complex systems such as an electrostatic motor connected to a plurality of gears. Typical in-plane lateral dimensions of the functional elements can range from one micron to several hundred microns, while the layer thicknesses are typically about 1–2 microns. Because the entire process is based on standard IC fabrication technology, a large number of fully assembled devices can be batch-fabricated on a silicon substrate without any need for piece-part assembly.

A microelectromechanical (MEM) engine or micromotor comprising a pair of linear actuators driven 90° out-of-phase to rotate an output drive gear is disclosed in U.S. Pat. No. 5,631,514 to Garcia et al, which is incorporated herein by reference. This micromotor can be used for actuation of complex MEM mechanisms and devices via a multi-gear transmission. However, some types of MEM devices require a precisely indexed motion over a small angle of rotation or over a small range of linear translation. Such precisely indexed motion is problematic when using the micromotor of Garcia et al due to an imprecise motion of the output drive gear. What is needed is an alternative actuator mechanism that can be used to provide a precise and controlled motion of a moveable member such as a rotary gear or a rack.

An advantage of the present invention is that an indexing apparatus is provided which can be used to smoothly and precisely rotate a gear over a predetermined angle, or to translate a rack over a predetermined distance.

Another advantage of the present invention is the amount of angular rotation or linear translation of a moveable member can be determined from an electrical drive signal supplied to the indexing apparatus.

Yet another advantage of the present invention is that the indexing apparatus can be operated with different types of actuators including electrostatic actuators, thermal actuators and electromagnetic actuators.

Still another advantage of the present invention is that the indexing apparatus can be used to control the motion of moveable members generally having lateral dimensions in the range of a few microns to a few millimeters.

These and other advantages of the method of the present invention will become evident to those skilled in the art.

SUMMARY OF THE INVENTION

The present invention relates to an indexing apparatus that comprises one or more actuators connected to a shuttle by a linkage to produce reciprocating motion in the shuttle. The shuttle has at least one drive tooth (generally wedge-shaped) at each opposing end thereof which engages with a plurality of indexing teeth (also generally wedge-shaped) of a moveable member to provide for motion of the moveable member. The actuators in the indexing apparatus can comprise electrostatic actuators, thermal actuators or electromagnetic actuators.

The shuttle, moveable member and actuator can be located on a substrate, preferably a silicon substrate. The shuttle and moveable member can also be formed, at least in part, of polycrystalline silicon (also termed polysilicon).

In some embodiments of the present invention, the moveable member can comprise a rotary gear. In other embodiments, the moveable member can be a rack (i.e. a translatable platform). In one preferred embodiment of the present invention, one of the drive teeth is located between an adjacent pair of the indexing teeth at any given time to limit or prevent any unrestrained motion of the moveable member (e.g. when there is loading of the moveable member which would tend to produce an unintended rotation or translation thereof).

The actuator and/or the shuttle can be located within the moveable member (e.g. within an outer circumference of a rotary gear, or within the periphery of a rack), or alternately outside the moveable member and proximate thereto.

The indexing apparatus can be formed as a micromachine (i.e. a microelectromechanical device) having lateral dimensions measured in terms of micrometers (also termed microns), or as a millimachine having lateral dimensions measured in terms of millimeters.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to construed as limiting the invention. In the drawings.

DETAILED DESCRIPTION OF THE INVENTION

Figure 1:
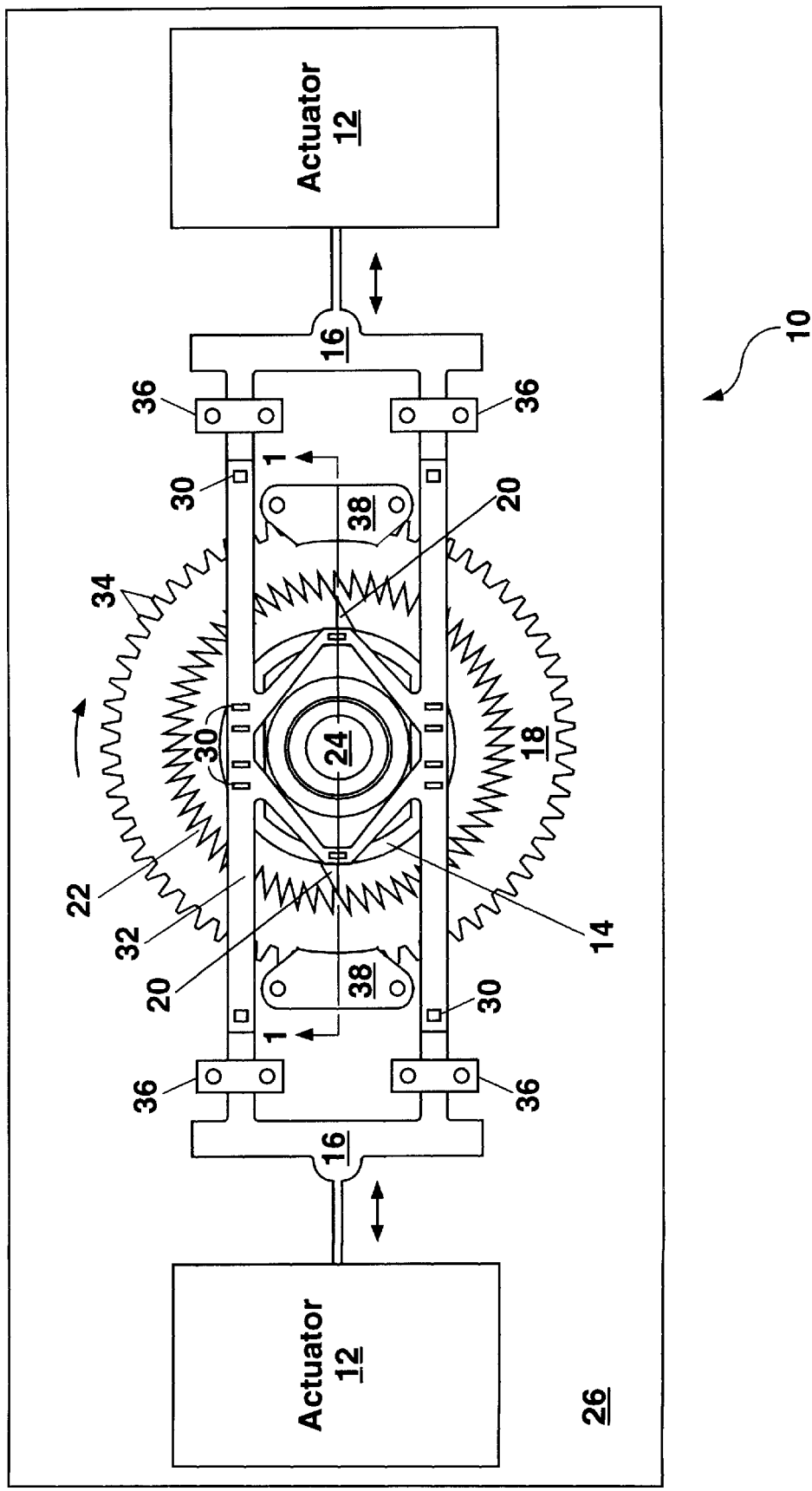
FIG. 1 shows a schematic plan view of a first embodiment of the indexing apparatus of the present invention.

Referring to FIG. 1, there is shown schematically a first embodiment of the indexing apparatus of the present invention. In FIG. 1, the indexing apparatus 10 comprises at least one actuator 12 connected to reciprocally drive a shuttle 14 through a connecting linkage 16. The shuttle 14 has one or more drive teeth 20 located at opposite ends of the shuttle 14 that are engageable with a plurality of indexing teeth 22 on the gear 18 to rotate the gear 18 in a particular direction (e.g. clockwise as shown in FIG. 1) about a hub 24 as the shuttle 14 moves back and forth.

The indexing apparatus 10 in the example of FIG. 1 can be formed on a substrate 26, generally comprising silicon, using surface micromachining processes. The surface micromachining processes are based on steps for depositing and photolithographically patterning alternate layers of low-stress polycrystalline silicon (also termed polysilicon) and a sacrificial material (e.g. silicon dioxide or a silicate glass) to build up the layer structure of the indexing apparatus 10 and thereby form each of the mechanical elements and features thereof as shown in FIG. 1. Altogether, four layers (also termed levels herein) of polysilicon are used to form both structural and non-structural films of the embodiment of the indexing apparatus 10 shown in FIG. 1.

Figure 2:
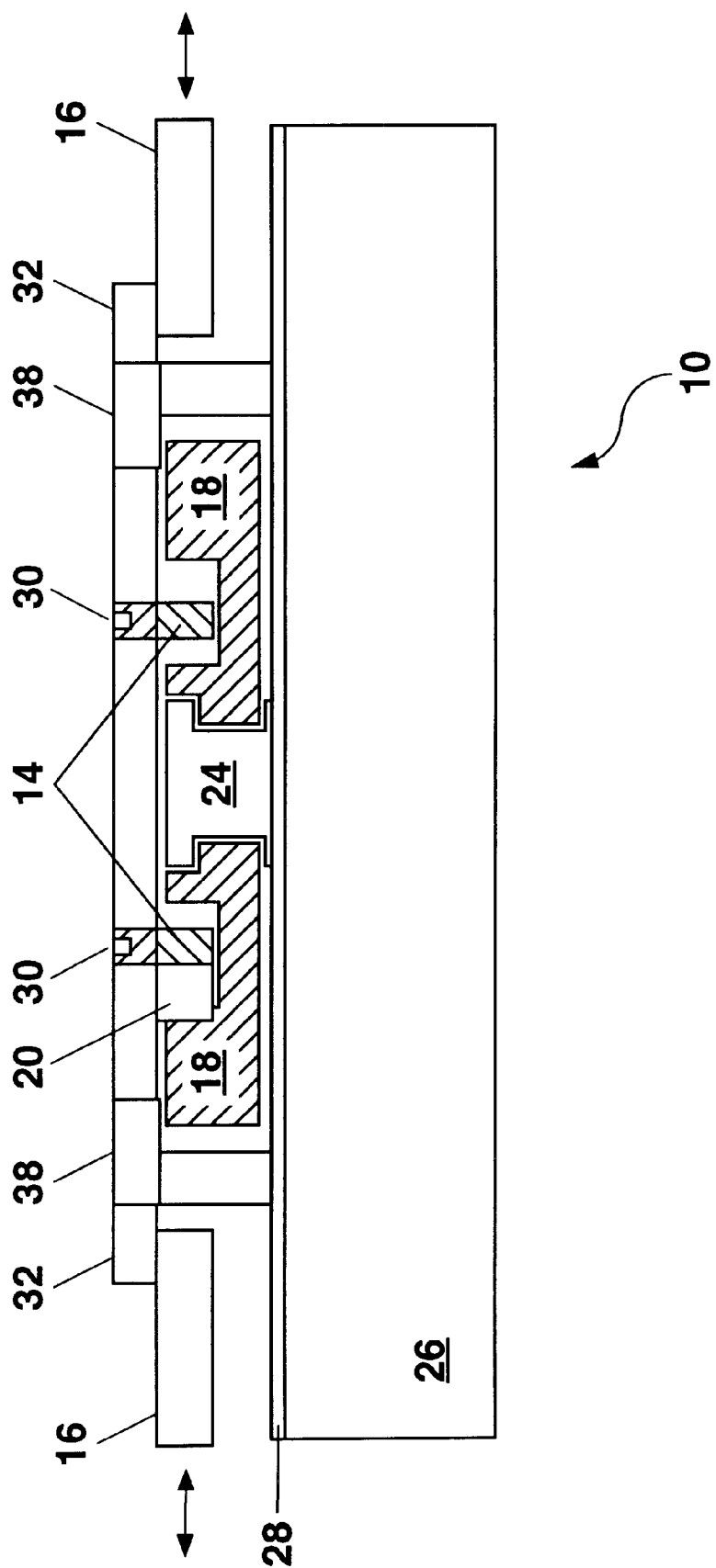
FIG. 2 shows a schematic cross-section view of the indexing apparatus of FIG. 1 along the line 1—1.

A silicon substrate 26 is preferably used and is initially prepared by blanketing the substrate 26 with a layer of a thermal oxide (e.g. 630 nanometers thick) formed by a conventional wet oxidation process at an elevated temperature (e.g 1050° C. for about 1.5 hours). A layer of low-stress silicon nitride (e.g. 800 nanometers thick) is then deposited over the thermal oxide layer using low-pressure chemical vapor deposition (LPCVD) at about 850° C. The thermal oxide and silicon nitride layers provide electrical isolation from the substrate 26 for a subsequently-deposited first polysilicon layer 28 as shown in FIG. 2.

The first polysilicon layer 28 is deposited over the substrate 26, blanketing the silicon nitride layer (not shown in FIG. 2), which can be patterned to provide one or more vias or through holes so that the first polysilicon layer 28 can electrically contact the substrate 26. All polysilicon depositions described herein are performed by LPCVD at a temperature of about 580° C. Phosphorous doping can be used to make the first polysilicon layer 28 and other overlying polysilicon layers electrically conductive as needed (e.g. for forming the electrostatic actuators 12, and electrical interconnections thereto). The first polysilicon layer 28 can be about 300 nanometers thick, and is used to form a voltage reference plane for electrical elements (e.g. electrostatic interdigitated comb or gap-closing actuators 12) on the substrate 26. An additional three layers of polysilicon are also preferably deposited by LPCVD, with typical layer thicknesses on the order of 0.5–2 µm or more for forming elements of the indexing apparatus 10 as discussed hereinafter.

The polysilicon layers are separated by sacrificial layers of silicon dioxide or silicate glass (e.g. a plasma-enhanced CVD oxide, also termed PECVD oxide; or a silicate glass deposited from the decomposition of tetraethylortho silicate, also termed TEOS, by LPCVD at about 750° C. and densified by a high temperature processing) having predetermined layer thicknesses (e.g. 0.5–2 µm) that are generally comparable to the thicknesses of adjacent polysilicon layers. In the cross-section 1—1 shown in FIG. 2, the sacrificial layers have been removed by an etch release step to free the indexing apparatus for operation.

The sacrificial layers are deposited to cover each succeeding polysilicon layer as needed, and to fill in spaces between mechanical elements or features thereof formed in the polysilicon layers. One or more sacrificial layers are then preferably planarized by chemical-mechanical polishing (CMP). Chemical-mechanical polishing is also advantageous for precisely adjusting the thickness of one or more of the sacrificial layers as needed to provide precise vertical dimensioning of mechanical elements of the indexing apparatus 10, and can include polishing down to expose the underlying polysilicon layer, and then depositing a thin layer of sacrificial material to a desired thickness. Additionally, CMP eliminates stringers formed by anisotropic etching (e.g. reactive ion etching) of polysilicon layers and can prevent mechanical interferences between elements formed in adjacent polysilicon layers. Without the use of chemical-mechanical polishing, the surface topography would become increasingly severe as each succeeding polysilicon or sacrificial layer is deposited upon an underlying patterned layer of material.

After each CMP process step, the resulting planarized sacrificial layer can be patterned by photolithographic definition and etching steps (e.g. reactive ion etching) to provide shaped openings for the subsequent deposition of an overlying layer of polysilicon. These shaped openings can be used for molding of mechanical elements or features thereof such as the hub 24 in FIG. 2, from the subsequently deposited polysilicon. Other of the mechanical elements can be formed directly by patterning and etching of one or more of the polysilicon layers. Additionally, the shaped openings can be used to form attachment points 30 as shown in FIGS. 1 and 2 by depositing polysilicon into the shaped openings to interconnect adjacent polysilicon layers (e.g. to attach the shuttle 14 to a frame 32, and to attach the frame 32 to the linkage 16). Furthermore, one or more of the patterned sacrificial layers can be used as an etch mask for anisotropically etching an underlying polysilicon layer.

Each structural polysilicon layer is generally annealed at a temperature of about 1100° C. for about 3 hours to relieve stress therein prior to photolithographically defining that layer. This minimizes mechanical stress which otherwise might distort elements of the indexing apparatus 10 such as gear 18 upon release of the apparatus 10 by etching away the sacrificial layers, or which otherwise might produce a bowing of the substrate 26.

To build up the structure of the indexing apparatus 10, the polysilicon or sacrificial layer deposition, photolithographic definition, and etching process steps are repeated multiple times as needed. The indexing apparatus 10 can then be released for operation by selectively etching away the sacrificial layers using a selective etchant comprising hydrofluoric acid (HF) that does not substantially chemically attack the polysilicon layers. For this purpose, a plurality of access holes (not shown) are formed through the polysilicon layers to expose each sacrificial layer or portion thereof to the selective etchant. After release, the first embodiment of the indexing apparatus 10 has a cross-section profile along the line 1—1 in FIG. 1 as is shown schematically in FIG. 2.

In FIG. 2, the gear 18 (also termed a rotary gear) can be formed from the combination of a second polysilicon layer and a third polysilicon layer. The gear 18 comprises a plurality of wedge-shaped indexing teeth 22, preferably odd in number, formed about a first circumference (e.g. an inner circumference) of the gear 18, and a plurality of gear teeth 34 formed about a second circumference (e.g. an outer circumference) of the gear 18 (see FIG. 1). The gear 18 is mounted on the hub 24 which can also be formed from the first and second polysilicon layers. The diameter of the gear 18 as shown in FIGS. 1 and 2 can be, for example, about 260 $\mu$m; and, in general, gears 18 fabricated by surface micromachining processes can range from about 10 $\mu$m diameter up to a few millimeters diameter.

In FIG. 2, the shuttle 14 comprising a pair wedge-shaped drive teeth 20 at opposite ends thereof, with the drive teeth 20 preferably being oppositely oriented, can be formed from the third polysilicon layer. The shuttle 14 is mounted below a frame 32 formed in a fourth polysilicon layer, and is attached to the frame 32 by a plurality of attachment points 30 wherein the fourth polysilicon layer is deposited to contact the third polysilicon layer. Additional attachment points 30 can be used to connect the frame 32 to the linkage 16 which is preferably fabricated in the second and third polysilicon layers for connection to an electrostatic interdigitated comb actuator 12, or to an electrostatic gap-closing actuator 12.

The electrostatic interdigitated comb actuator 12 is of conventional design (see, for example, U.S. Pat. No. 5,631,514 to Garcia et al) and comprises one or more fixed combs formed of polysilicon that are meshed (i.e. interdigitated) with oppositely oriented moveable combs, also formed of polysilicon. The moveable combs are attached to linkage 16 to provide a predetermined range of linear reciprocating motion in response to a periodic drive voltage signal applied to the actuator 12. A pair of oppositely-oriented actuators 12 are shown in FIG. 1; and these actuators 12 operate in tandem to move the shuttle 14 back and forth to alternately engage one of the drive teeth 20 with adjacent indexing teeth 22 to urge the gear 18 along a curved path, rotating the gear 18. The reciprocating motion of the shuttle 14 is preferably constrained to be linear motion in the horizontal direction indicated by the double-headed arrows in FIG. 1 by the provision of guides 36 formed in the second, third and fourth polysilicon layers. These guides 36 surround arms of the linkage 16 to limit motion except in the direction shown by the double-headed arrows. Additionally, standoff tabs 38 can be provided as shown in FIG. 1 to control and limit play or wobbling in gear 18 in a direction normal to a surface of the substrate 26 to provide for proper meshing with additional gears (not shown) that can be driven by rotation of gear 18.

Figure 3A:
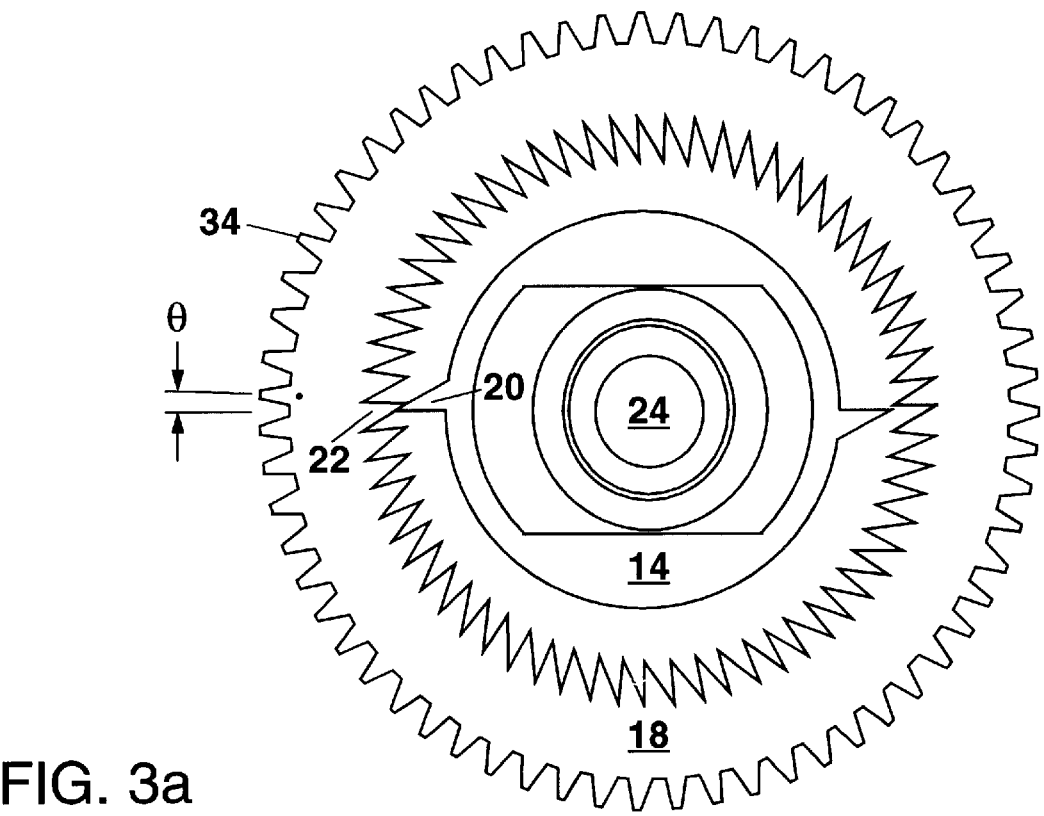
FIGS. 3a–3d illustrate operation of the indexing apparatus of FIG. 1.
Figure 3B:
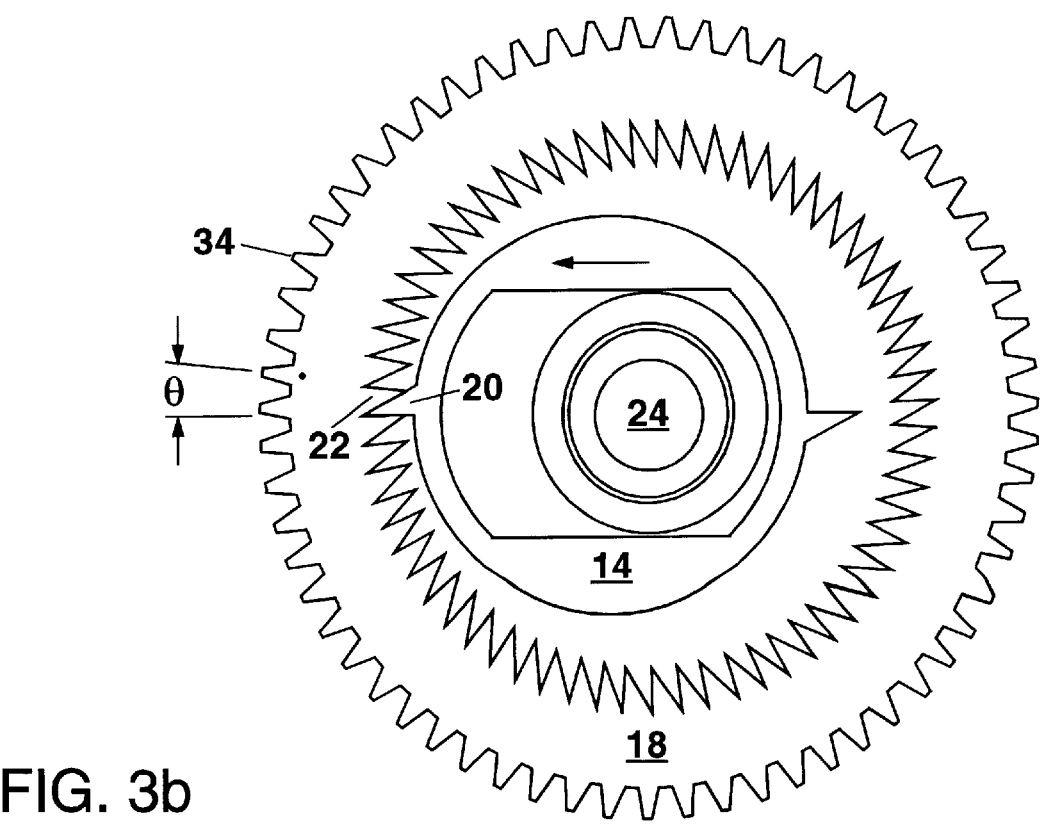

FIGS. 3a–3b illustrate the mechanism for rotating gear 18 in response to reciprocating motion of shuttle 14 produced by actuators 12. In FIG. 3a, as the shuttle 14 is moved to the left by the actuators 12 acting in tandem through linkage 16 and frame 32, the drive tooth 20 engages one of the indexing teeth 22 of the gear 18 causing a slight clockwise rotation of the gear about an angle $\theta$. With further movement of the shuttle 14 to the left as shown in FIG. 3b, the wedge-shaped drive tooth 20 continues to slide across the wedge-shaped indexing tooth 22 resulting in a further increase in the rotation angle $\theta$. Further movement of the drive tooth 20 is prevented in FIG. 3b when the drive tooth 20 is fully meshed between a pair of adjacent indexing teeth 22. At this point, the rotation angle, $\theta$, can be precisely determined.

Figure 3C:
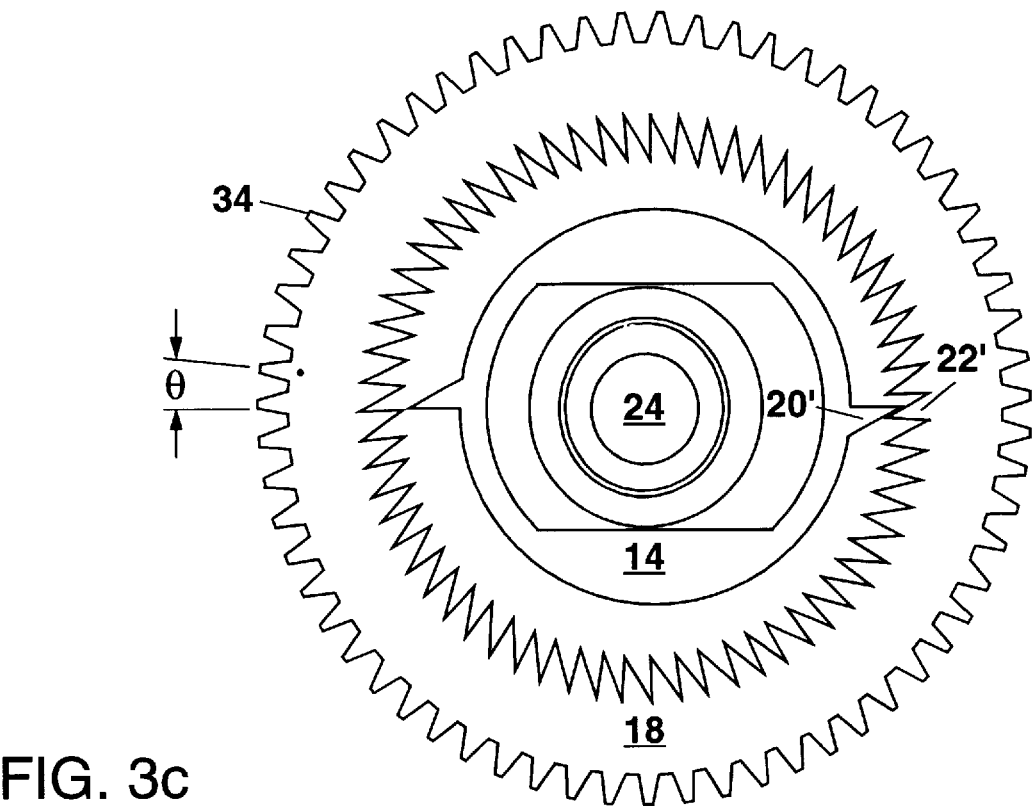
Figure 3D:
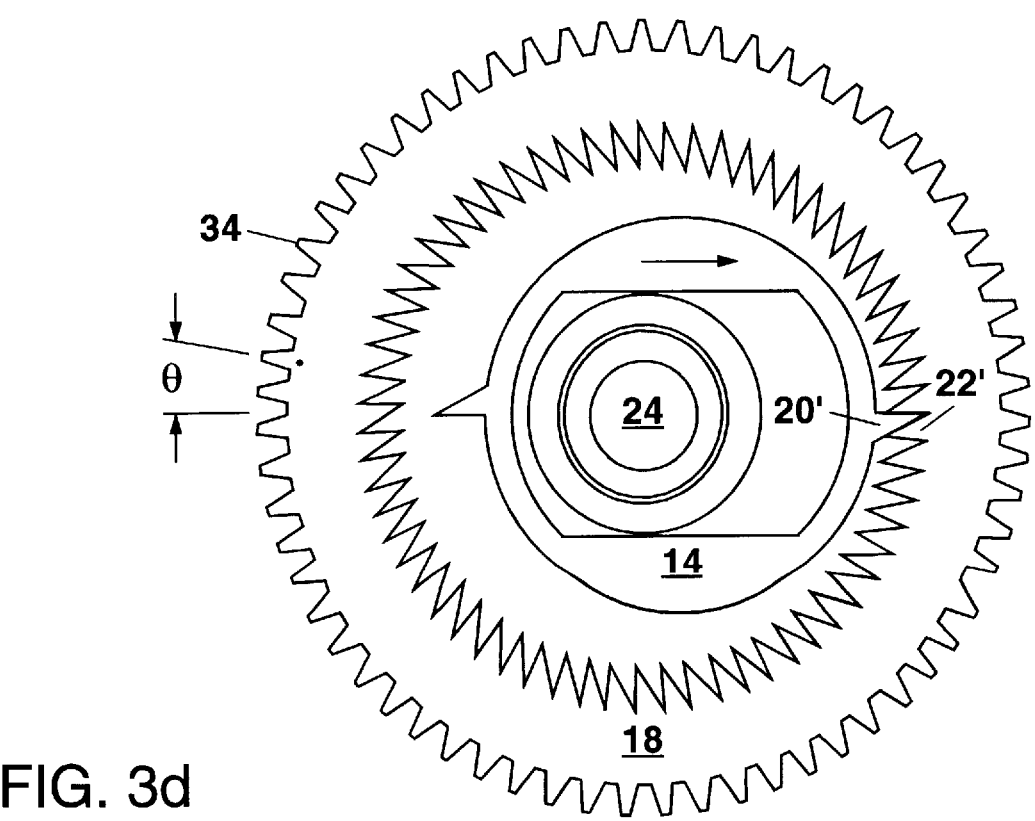

In FIGS. 3c and 3d, further rotation of the gear 18 can be accomplished by moving the shuttle 14 to the right. In FIG. 3c, the opposite drive tooth 20' is shown as the drive tooth initially engages adjacent indexing tooth 22'. Since there are an odd number of indexing teeth 22 in the embodiment of the indexing apparatus 10 in FIGS. 1–3, the drive tooth 20' engages indexing tooth 22' near a midpoint thereof. At this point of engagement the rotation angle, $\theta$, remains unchanged from FIG. 3b. However, with further rightward movement of the shuttle 14, drive tooth 20' begins to rotate gear 18 as the drive tooth 20' slides across indexing tooth 22'. At the rightmost extent of travel of the shuttle 14, the gear 18 is further rotated in the clockwise direction from FIGS. 2b and 2c.

By alternately moving the shuttle 14 back and forth (i.e. reciprocating motion) the gear 18 can be precisely and controllably urged in a particular direction determined by the orientation of the drive teeth 20 and the indexing teeth 22. To provide an indexing apparatus that rotates in the counterclockwise direction, the orientation of the drive teeth 20 and the indexing teeth 22 can be reversed from that shown in FIGS. 3a–3d.

An advantage of the indexing apparatus 10 of the present invention is that the amount of rotation of gear 18 can be determined since each back and forth movement cycle of the shuttle 14 rotates the gear 18 by a predetermined indexing angle, $\theta_i$. In the case of an odd number, n, of indexing teeth 22 as shown in FIGS. 3a–3d, the indexing angle, $\theta_i$, is equal to 360/n degrees.

The embodiment of the present invention shown in FIGS. 1 and 3a–3d has also been designed to prevent or limit backward or forward movement of the gear 18 in the absence of reciprocating motion of the shuttle 14. This is accomplished by designing the shuttle 14 so that one of the drive teeth 20 is always located between a pair of adjacent indexing teeth 22 to act as an interdental stop. In this way any backward movement of the gear 18 produced, for example, by back pressure from other gears meshing with gear 18 will be limited by the intervention of one of the driving teeth 20. Rotation of the gear 18 by reciprocating motion of the shuttle 14 is unimpeded, however, since only one of the drive teeth 20 is in contact with an indexing tooth 22 at any given time and the other drive tooth 20 is fully withdrawn from engagement as shown in FIGS. 3b–3d. Additionally, backward movement of the gear 18 can be prevented by the use of an counter-rotation pawl (not shown), or by tailoring the drive signals to the actuators 12 (e.g. to provide a time delay to allow mechanical transients to die down before advancing the gear 18).

Figure 4:
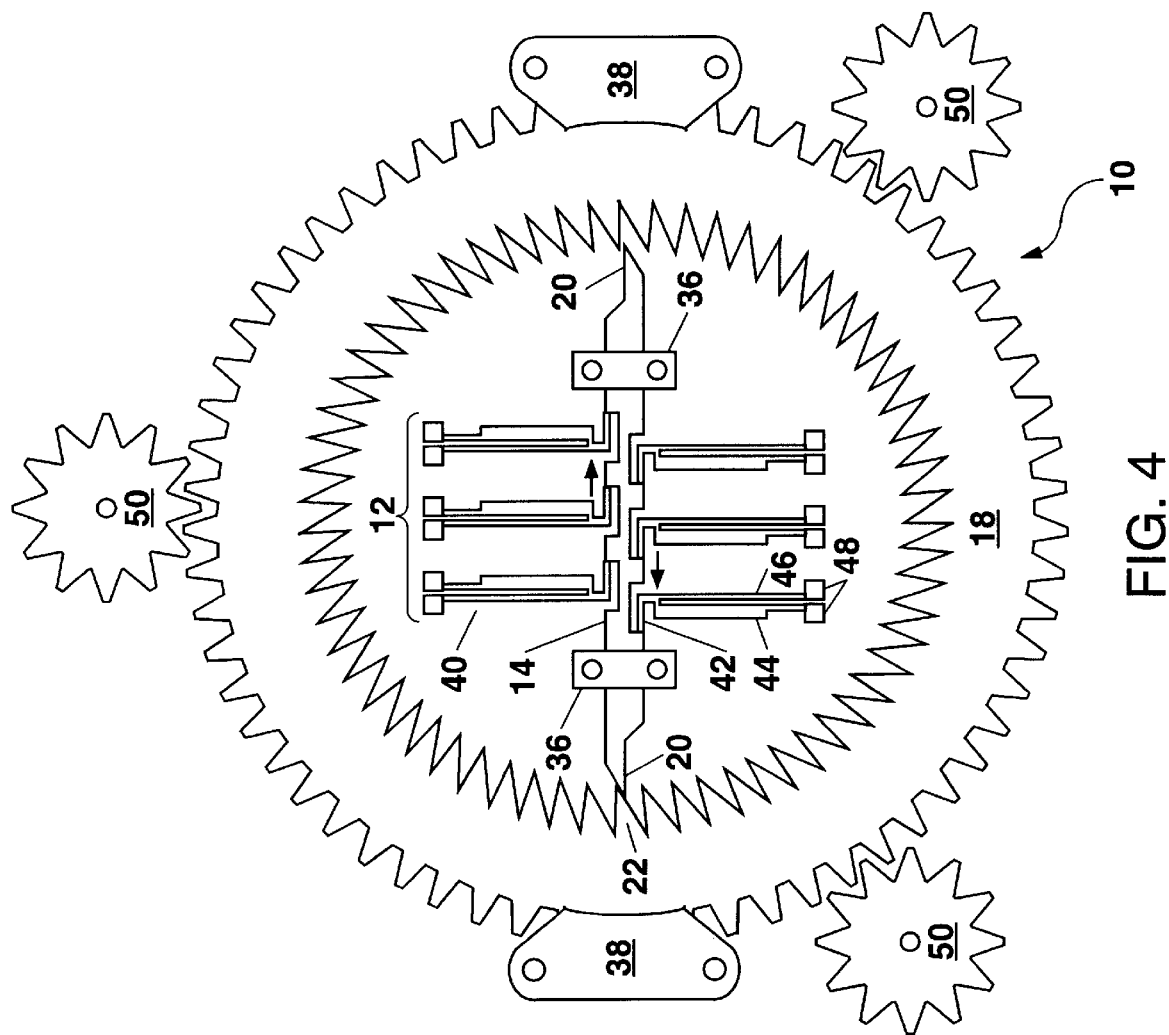
FIG. 4 shows a schematic plan view of a second embodiment of the indexing apparatus of the present invention.

Other embodiments of an indexing apparatus 10 can be formed according to the present invention. For example, a bi-directional actuator 12 can be provided located within an outer circumference of a rotary gear 18 as shown in FIG. 4. This second embodiment of the present invention can be formed by surface micromachining processes as described heretofore, and is particularly applicable for large-size gears, drive wheels or rotatable platforms that have a diameter or size larger than lateral dimensions of the actuator 12.

In FIG. 4, the bi-directional actuator 12 comprises a plurality of ganged thermal actuators 40 attached to the shuttle 14 by flexure joints 42 and electrically activated in parallel. Each thermal actuator 40 further comprises a wide cold arm 44 and a narrow hot arm 46 fabricated out of doped polysilicon. The cold and hot arms, 44 and 46, of each thermal actuator 40 are interconnected near the flexure joint 42, and are attached at the opposite end to anchors 48. To operate each thermal actuator 40, an electrical current is passed through the cold and hot arms, 44 and 46 (i.e. between the anchors 48), thereby heating the hot arm 46 to a larger extent than the cold arm 44 which has a lower electrical resistivity due to a larger cross-sectional area. The hot arm 46 thus expands by heating to a greater extent than the cold arm 44, and this expansion of the hot arm 46 bends the thermal actuator 40 in a direction from the hot arm 46 towards the cold arm 44 as indicated by the horizontal arrows in FIG. 4.

A lower set of ganged thermal actuators 40 can be electrically activated in parallel to move the shuttle 14 to the left in FIG. 4; whereas an upper set ganged actuators 40 can be electrically activated in parallel to move the shuttle 14 to the right. Alternate activation of the lower and upper sets of ganged actuators 40 forming the bi-directional actuator 12 produces reciprocating motion in the shuttle 14 to rotate the gear 18 as described heretofore.

Guides 36 can be provided as shown in FIG. 4 to guide movement of the shuttle 14 along a substantially straight (i.e. linear) path. Idler gears 50 spaced about the gear 18 can be used to limit lateral movement of gear 18 while permitting rotation thereof. Alternately a circular channel can be formed in a lower surface of gear 18 to ride on a circular track formed in an underlying polysilicon layer on the substrate 26 to guide rotation of gear 18 along a circular path while substantially limiting any lateral movement or play. Finally, standoff tabs 38 are preferably spaced about the gear 18 to prevent or limit out-of-plane movement of the gear 18 during rotation to provide for proper meshing with other gears to be driven by or meshed with the gear 18 of the indexing apparatus 10.

Figure 5:
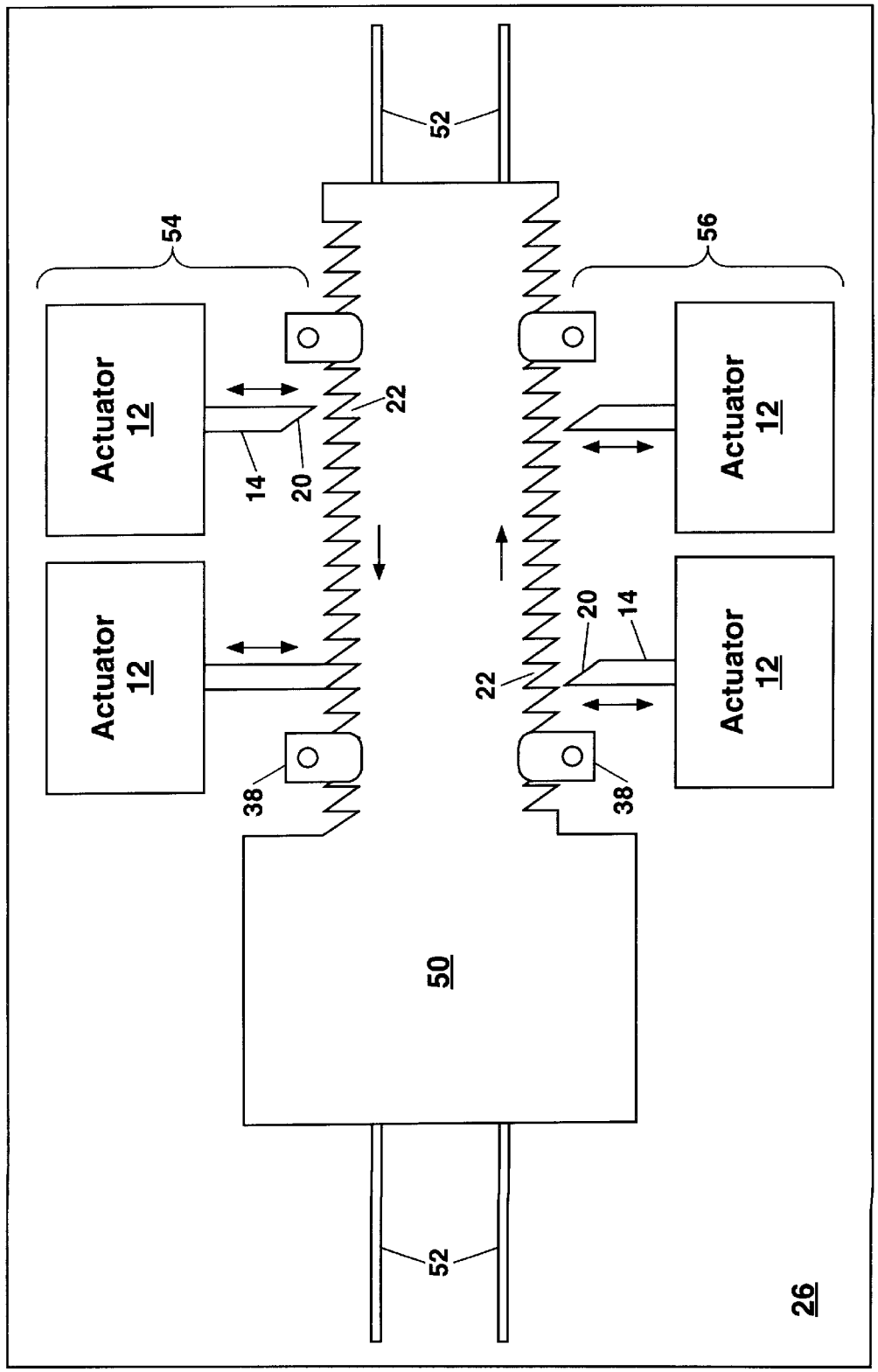
FIG. 5 shows a schematic plan view of a third embodiment of the indexing apparatus of the present invention.

The indexing apparatus 10 of the present invention can further include embodiments which provide a range linear motion rather than rotary motion as shown in the embodiments in FIGS. 1 and 4. FIG. 5 shows a third embodiment of the indexing apparatus 10 of the present invention for moving a rack or platform 50 back and forth along a straight path defined by tracks 52 formed on the substrate 26 and mating channels (not shown) formed on an underside of the rack 50. The term "rack" is used herein to denote the moveable platform 50 in FIG. 5 by analogy to a conventional rack and pinion.

In FIG. 5, the rack 50 is moveable back and forth along a horizontal linear (i.e. straight) path defined by tracks 52 by using an upper set 54 and a lower set 56 of actuators 12 to provide reciprocating motion of shuttles 14 and drive teeth 20 in a direction that is generally substantially perpendicular to the path of travel of the rack 50. The upper set 54 of actuators 12 can be operated to alternately engage connected drive teeth 20 with an upper row of indexing teeth 22 to move the rack 50 to the left as shown by the uppermost horizontal arrow in FIG. 5. Each actuator 12 in the upper set slidingly engages one of the upper set of indexing teeth 22 to move the stage 50 by a wedging action over a predetermined distance (e.g. about one-half the spacing between adjacent indexing teeth 22 which can be, for example, about 5–100 $\mu$m). Similarly, the rack 50 can be moved to the right in FIG. 5 by alternately electrically activating the actuators 12 in the lower set 56, while the upper set 54 of actuators 12 is deactivated. Those skilled in the art will understand that other embodiments of the present invention based on the teachings in FIG. 5 can be constructed using only a single set of actuators 12 when the rack 50 is to be moved in only a single direction.

The third embodiment of the present invention can be fabricated using surface micromachining processes as described heretofore with reference to FIGS. 1 and 2. Briefly, a first polysilicon layer can be used to blanket the substrate 26 and serve as a voltage reference plane. The tracks 52 can then be formed in a second polysilicon layer using micromachining processes as described heretofore. The rack 50, actuators 12 and shuttle 14 can be formed by these micromachining processes using the second polysilicon layer and a third polysilicon layer. Finally, the guides 38 can be formed in the second and third polysilicon layers and a fourth polysilicon layer.

During movement of the rack 50 in a particular direction, one of the drive teeth 20 of set 54 or 56 is preferably engaged with a corresponding indexing tooth 22 at any given time to control movement of the rack 50 and to prevent any unintended backward motion thereof (e.g. due to backward force exerted on the rack 50 by, for example, a self-assembling structure which is being erected or disassembled by movement of the rack 50). The drive teeth 20 of the remaining actuators 12 can be either completely disengaged from the indexing teeth 22, or one or more of the remaining drive teeth 20 can be partially engaged with the indexing teeth 22 to act as a stop to help prevent any unintended backward motion of rack 50.

Figure 6:
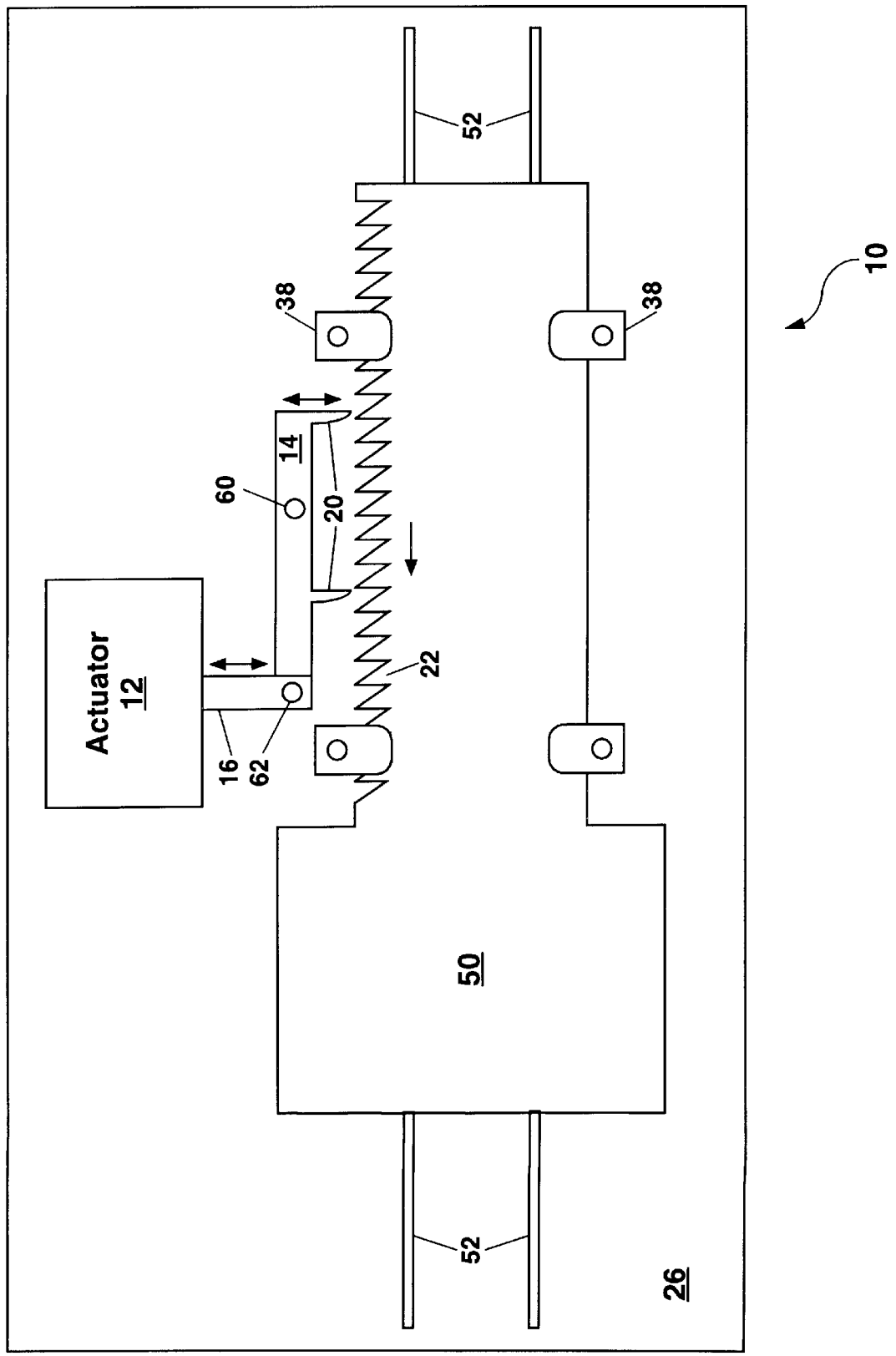
FIG. 6 shows a schematic plan view of a fourth embodiment of the indexing apparatus of the present invention.

FIG. 6 shows a fourth embodiment of the indexing apparatus 10 of the present invention. In the fourth embodiment in FIG. 6, a shuttle 14 containing drive teeth 20 at opposite ends thereof can be used to move a rack 50 along a predetermined unidirectional path defined by a pair of tracks 52 which mate with channels (not shown) formed on an underside of the rack 50. Reciprocating motion of the shuttle 14 about a first pin joint 60 is produced by a single actuator 12 coupled to the shuttle 14 by linkage 16 and a second pin joint 62. In FIG. 6, the wedge-shaped drive teeth 20 can have a curved surface that contacts the indexing teeth 22, or alternately a straight surface as shown in FIG. 5. The fourth embodiment of the indexing apparatus 10 can be formed using surface micromachining processes as described heretofore.

Figure 7:
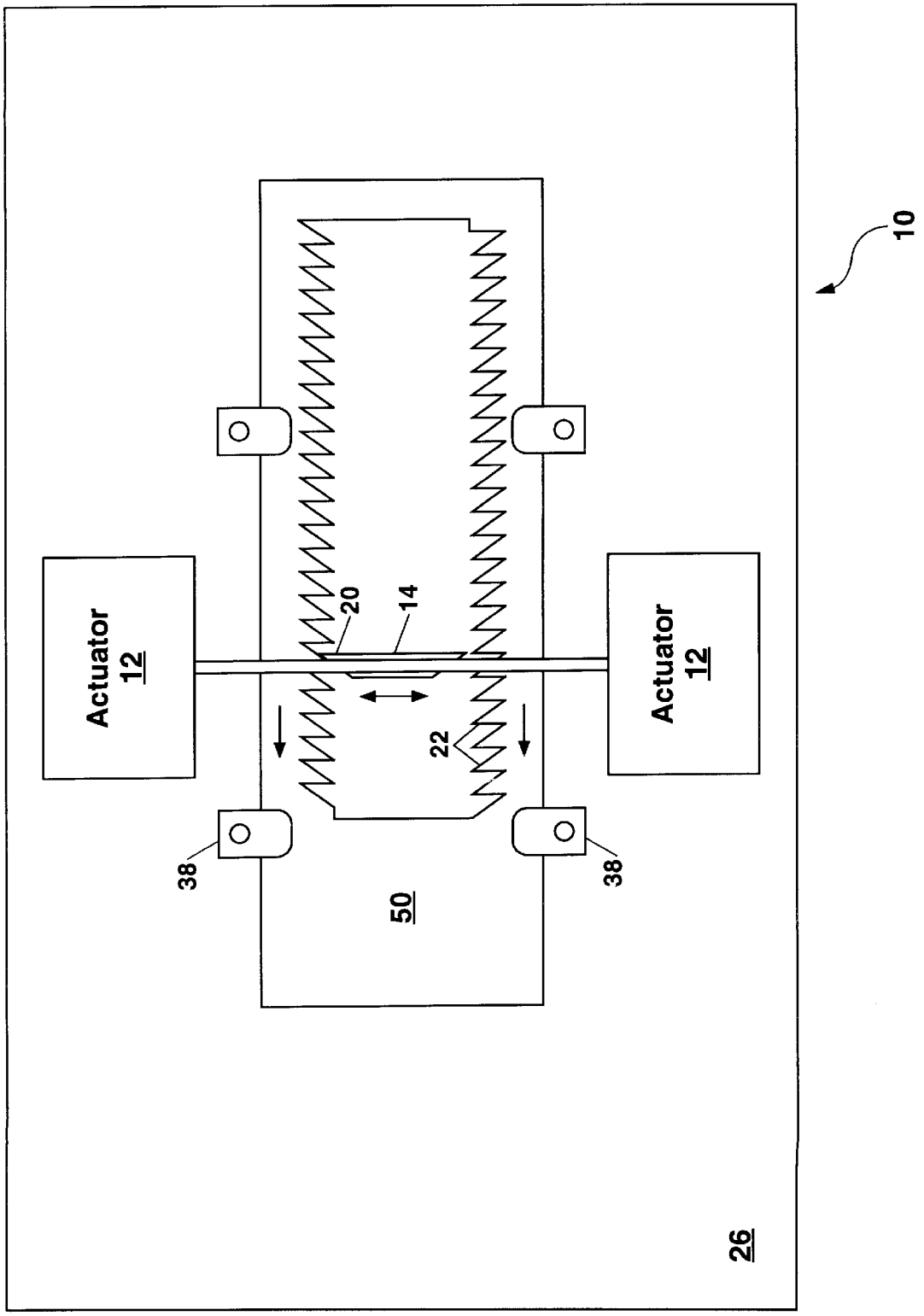
FIG. 7 shows a schematic plan view of a fifth embodiment of the indexing apparatus of the present invention.

FIG. 7 shows a fifth embodiment of the indexing apparatus 10 of the present invention. The indexing apparatus 10 in FIG. 7 provides for linear motion of a rack 50 in a single predetermined direction (e.g. to the left as indicated by the horizontal arrows). In the fifth embodiment in FIG. 7, a top row and a bottom row of indexing teeth 22 are formed in the rack 50, with a reciprocating shuttle 14 having drive teeth 20 that alternately engage indexing teeth 22 in the top and bottom rows to force the rack 50 to move along a pathway defined by a plurality of guides 38. A pair of actuators 12 as shown in FIG. 7 can alternately be electrically activated to produce reciprocating motion of the shuttle 14 to move the rack 50 over a generally linear path. Alternately, a single bidirectional actuator 12, located either between the rows of indexing teeth 22 or outside the rows of indexing teeth 22, can be used to drive the shuttle 14 for moving the rack 50. The fifth embodiment of the present invention can be fabricated using surface micromachining processes as described heretofore with reference to FIGS. 1 and 2.

Other applications and variations of the indexing apparatus 10 of the present invention will become evident to those skilled in the art. For example, an indexing apparatus 10 on a larger scale (e.g. as a millimachine) can be formed by substituting LIGA ("Lithographic Galvanoforming Abforming", an acronym which evolved from the Karlsruhe Nuclear Research Center in Germany) fabrication processes as disclosed, for example, in U.S. Pat. No. 5,378,583 to Guckel et al, which is incorporated herein by reference, for the surface micromachining processes described heretofore.

In fabrication of a millimeter-size indexing apparatus 10 by LIGA processes, a silicon substrate is generally preferred. The various elements of the indexing apparatus 10 in FIGS. 1–7 including the actuators 12, shuttle 14, linkages 16 and gear 18 or rack 50 can be alternately formed by a series of LIGA process steps. These LIGA process steps include patterning of a polymethyl methacrylate (PMMA) sheet resist to define the shapes of the individual elements, and then electroplating a metal (e.g. nickel or copper) to form the individual elements. Using LIGA processes, the various elements of the indexing apparatus 10 can be formed separately and then assembled on the substrate 26.

In a millimeter-size indexing apparatus 10, an electromagnetic actuator 12 can be used for reciprocating the shuttle 14. Such an electromagnetic actuator 12 uses a magnetic coil responsive to an applied electrical current to move an armature back and forth, with the armature being coupled to the shuttle 14. Details of an electromagnetic actuator formed by LIGA processes can be found, for example, in U.S. patent application Ser. No. 08/874,815 to Garcia et al which is incorporated herein by reference.

The actual scope of the invention is intended to be defined in the following claims when viewed in their proper perspective based on the prior art.

What is claimed is:

1. An indexing apparatus comprising:
   (a) at least one actuator formed on a silicon substrate and producing reciprocating motion;
   (b) a shuttle connected to each actuator and having a drive tooth at one end thereof; and
   (c) a moveable member having a plurality of indexing teeth which are engageable by the drive tooth of the shuttle to provide for motion of the moveable member.

2. The apparatus of claim 1 wherein the actuator is located proximate to the moveable member and is connected to the shuttle by a linkage.

3. The apparatus of claim 1 wherein the moveable member comprises a gear.

4. The apparatus of claim 3 wherein the gear is a rotary gear.

5. The apparatus of claim 4 wherein the actuator is located within an outer circumference of the rotary gear.

6. The apparatus of claim 1 wherein the moveable member comprises a rack.

7. The apparatus of claim 1 wherein the drive teeth and the indexing teeth are wedge-shaped.

8. The apparatus of claim 1 wherein the moveable member comprises polycrystalline silicon.

9. The apparatus of claim 1 wherein the moveable member comprises metal.

10. The apparatus of claim 1 wherein the actuator comprises an electrostatic actuator.

11. The apparatus of claim 1 wherein the actuator comprises a thermal actuator.

12. The apparatus of claim 1 wherein the actuator comprises an electromagnetic actuator.

13. An indexing apparatus comprising:
   (a) a moveable member formed of polycrystalline silicon and having a plurality of indexing teeth; and
   (b) a reciprocating shuttle formed of polycrystalline silicon and having a pair of drive teeth that alternately engage the indexing teeth of the moveable member to produce motion thereof.

14. The apparatus of claim 13 further comprising a substrate for holding the gear and shuttle.

15. The apparatus of claim 14 wherein the substrate comprises silicon.

16. The apparatus of claim 14 further comprising an actuator formed on the substrate and operatively connected to the shuttle to provide for reciprocation thereof.

17. The apparatus of claim 16 wherein the actuator is connected to the shuttle by a linkage.

18. The apparatus of claim 16 wherein the actuator is an electrostatic actuator.

19. The apparatus of claim 16 wherein the actuator is a thermal actuator.

20. The apparatus of claim 13 wherein the moveable member comprises a gear.

21. The apparatus of claim 20 wherein the plurality of indexing teeth comprises an odd number of indexing teeth.

22. The apparatus of claim 13 wherein the moveable member comprises a rack.

23. The apparatus of claim 13 wherein the drive teeth and indexing teeth are wedge-shaped.

24. The apparatus of claim 23 wherein one of the drive teeth is located between an adjacent pair of the indexing teeth at any given time to limit unrestrained motion of the moveable member.

25. An indexing apparatus comprising:
   (a) an electrically-activated actuator to produce reciprocating motion;
   (b) an elongate shuttle connected to the actuator and having drive teeth at opposite ends thereof; and
   (c) a moveable member having a plurality of indexing teeth which are engageable by the drive teeth of the shuttle to urge the moveable member along a path.

26. The apparatus of claim 25 wherein the actuator, shuttle and moveable member are located on a common substrate.

27. The apparatus of claim 26 wherein the substrate comprises silicon.

28. The apparatus of claim 25 wherein the actuator is located proximate to the moveable member and is connected to the shuttle by a linkage.

29. The apparatus of claim 25 wherein the moveable member comprises a gear.

30. The apparatus of claim 29 wherein the actuator is located within the periphery of the gear.

31. The apparatus of claim 25 wherein the moveable member comprises a rack.

32. The apparatus of claim 25 wherein the drive teeth and the indexing teeth are wedge-shaped.

33. The apparatus of claim 25 wherein the moveable member comprises polycrystalline silicon.

34. The apparatus of claim 25 wherein the moveable member comprises metal.

35. The apparatus of claim 25 wherein the actuator comprises an electrostatic actuator.

36. The apparatus of claim 25 wherein the actuator comprises a thermal actuator.

37. The apparatus of claim 25 wherein the actuator comprises an electromagnetic actuator.

38. A microelectromechanical (MEM) indexing apparatus comprising:
- (a) an electrostatic actuator formed on a substrate and producing reciprocating motion;
- (b) a shuttle located on the substrate and connected to the actuator, the shuttle having at least one drive tooth at one end thereof; and
- (c) a moveable member located on the substrate and having a plurality of indexing teeth which are engageable by the drive tooth of the shuttle to urge the moveable member along a path.

39. The apparatus of claim 38 wherein the substrate comprises silicon.

40. The apparatus of claim 39 wherein the moveable member comprises a gear formed, at least in part, from polycrystalline silicon.

41. The apparatus of claim 40 wherein the electrostatic actuator is located within a periphery of the rotary gear.

42. The apparatus of claim 38 wherein the drive teeth and indexing teeth are wedge-shaped.

43. The apparatus of claim 38 wherein the path is curved.

44. The apparatus of claim 38 wherein the path is substantially straight.

* * * * *